(12) United States Patent
Byrne et al.

(10) Patent No.: US 6,349,840 B1
(45) Date of Patent: Feb. 26, 2002

(54) DETACHABLE RAMP CARRYING SYSTEM FOR MOVING CONTAINERS

(76) Inventors: Patrick Byrne; Edward Nolan, both of 28 Barker St., Mt. Kisco, NY (US) 10549

( * ) Notice: Subject to any disclaimer, the term of this patent is extended or adjusted under 35 U.S.C. 154(b) by 0 days.

(21) Appl. No.: 09/671,541

(22) Filed: Sep. 27, 2000

(51) Int. Cl.⁷ .............................................. B65D 90/00
(52) U.S. Cl. ..................................................... 220/1.5
(58) Field of Search ......................... 220/1.5; 410/156; 108/56.3

(56) References Cited

U.S. PATENT DOCUMENTS

| | | | |
|---|---|---|---|
| 1,740,000 A | * 12/1929 | Andrews et al. ............. | 220/1.5 |
| 4,221,536 A | * 9/1980 | McFee ..................... | 220/1.5 X |
| 4,715,508 A | * 12/1987 | Schurch .................... | 220/1.5 X |
| 5,284,266 A | * 2/1994 | Januel et al. ................. | 220/1.5 |
| 5,454,686 A | * 10/1995 | Gearin et al. ............ | 220/1.5 X |
| 5,671,855 A | * 9/1997 | Norman, Jr. et al. ........ | 220/1.5 |

\* cited by examiner

*Primary Examiner*—Steven Pollard
(74) *Attorney, Agent, or Firm*—Goldstein Law Offices, P.C.

(57) ABSTRACT

A detachable ramp carrying system for moving containers including a pair of securement brackets coupled with the horizontal lower segments of opposed L-shaped brackets of the moving container. The securement brackets support the ramp thereon disposed below the closed lower end of the container.

5 Claims, 2 Drawing Sheets

U.S. 6,349,840 B1

DETACHABLE RAMP CARRYING SYSTEM FOR MOVING CONTAINERS

BACKGROUND OF THE INVENTION

The present invention relates to a detachable ramp carrying system for moving containers and more particularly pertains to allowing a ramp to be transported for use with unloading a moving container.

The use of cargo container assemblies is known in the prior art. More specifically, cargo container assemblies heretofore devised and utilized for the purpose of carrying items for international transportation are known to consist basically of familiar, expected and obvious structural configurations, notwithstanding the myriad of designs encompassed by the crowded prior art which have been developed for the fulfillment of countless objectives and requirements.

By way of example, U.S. Pat. No. 5,755,472 to Clive-Smith discloses a cargo shipping container, suited for international transportation, with a folding ramp incorporated. U.S. Pat. No. 5,275,301 to Clive-Smith discloses an international freight container with a pivotally or collapsibly mounted gate incorporated. U.S. Pat. No. 5,368,179 to Belle discloses a container with foldable props incorporated. U.S. Pat. No. 5,624,049 to Kovash discloses a container with an inner receptacle.

While these devices fulfill their respective, particular objective and requirements, the aforementioned patents do not describe a detachable ramp carrying system for moving containers for allowing a ramp to be transported for use with unloading a moving container.

In this respect, the detachable ramp carrying system for moving containers according to the present invention substantially departs from the conventional concepts and designs of the prior art, and in doing so provides an apparatus primarily developed for the purpose of allowing a ramp to be transported for use with unloading a moving container.

Therefore, it can be appreciated that there exists a continuing need for a new and improved detachable ramp carrying system for moving containers which can be used for allowing a ramp to be transported for use with unloading a moving container. In this regard, the present invention substantially fulfills this need.

SUMMARY OF THE INVENTION

In the view of the foregoing disadvantages inherent in the known types of cargo container assemblies now present in the prior art, the present invention provides an improved detachable ramp carrying system for moving containers. As such, the general purpose of the present invention, which will be described subsequently in greater detail, is to provide a new and improved detachable ramp carrying system for moving containers which has all the advantages of the prior art and none of the disadvantages.

To attain this, the present invention essentially comprises a pair of securement brackets coupled with the horizontal lower segments of opposed L-shaped brackets of the moving container. The securement brackets support the ramp thereon disposed below the closed lower end of the container. Each of the securement brackets include an inner component positioned between two of the L-shaped brackets of the moving container. The inner component includes a top vertical segment. The top vertical segment has an upper end and a lower end. The inner component includes a top horizontal segment extending outwardly from the lower end of the top vertical segment. The top horizontal segment has a free end. A short intermediate vertical segment extends downwardly from the free end of the top horizontal segment. The short intermediate vertical segment has a free end. An intermediate horizontal segment extends inwardly from the free end of the intermediate vertical segment whereby a channel is formed between the top horizontal segment and the intermediate horizontal segment. The intermediate horizontal segment has a free end. A lower vertical segment extends downwardly from the free end of the intermediate horizontal segment and is linearly aligned with the top vertical segment. The lower vertical segment has a free end. A lower horizontal segment extends outwardly from the free end of the lower vertical segment. The inner component includes an upper adjustable securement bolt extending outwardly from the top vertical segment. The inner component includes a pair of lower threaded bolts extending inwardly from the lower vertical segment. The inner component is positioned with respect to one of the L-shaped brackets whereby the lower horizontal component is received within the channel and the top vertical segment abuts the upper vertical segment with the upper adjustable securement bolt extending against the upper vertical segment of an adjacent L-shaped bracket. Each of the securement brackets include an outer component positioned against one of the L-shaped brackets opposed from the inner component. The outer component includes a raised horizontal plate having an inner end and an outer end. The outer component includes an intermediate vertical plate extending downwardly from the inner end of the raised horizontal plate. The intermediate plate has a free lower end. The intermediate vertical plate has a pair of apertures therethrough. The outer component includes a lower horizontal plate extending inwardly from the free lower end of the intermediate vertical plate. The outer component is positioned with respect to one of the L-shaped brackets whereby the intermediate vertical plate abuts the upper vertical segment of the L-shaped bracket with the apertures receiving the lower threaded bolts of the inner component therein for securement by wing nuts and the lower horizontal plate is positioned below the lower horizontal segment of the inner component.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new and improved detachable ramp carrying system for moving containers which has all the advantages of the prior art cargo container assemblies and none of the disadvantages.

It is another object of the present invention to provide a new and improved detachable ramp carrying system for moving containers which may be easily and efficiently manufactured and marketed.

It is a further object of the present invention to provide a new and improved detachable ramp carrying system for moving containers which is of durable and reliable construction.

An even further object of the present invention is to provide a new and improved detachable ramp carrying system for moving containers which is susceptible of a low cost of manufacture with regard to both materials and labor, and which accordingly is then susceptible of low prices of sale to the consuming public, thereby making such a detachable ramp carrying system for moving containers economically available to the buying public.

Even still another object of the present invention is to provide a new and improved detachable ramp carrying system for moving containers for allowing a ramp to be transported for use with unloading a moving container.

Lastly, it is an object of the present invention to provide a new and improved detachable ramp carrying system for moving containers including a pair of securement brackets coupled with the horizontal lower segments of opposed L-shaped brackets of the moving container. The securement brackets support the ramp thereon disposed below the closed lower end of the container.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

The same reference numerals refer to the same parts through the various figures.

DESCRIPTION OF THE PREFERRED EMBODIMENT

Figure 1:
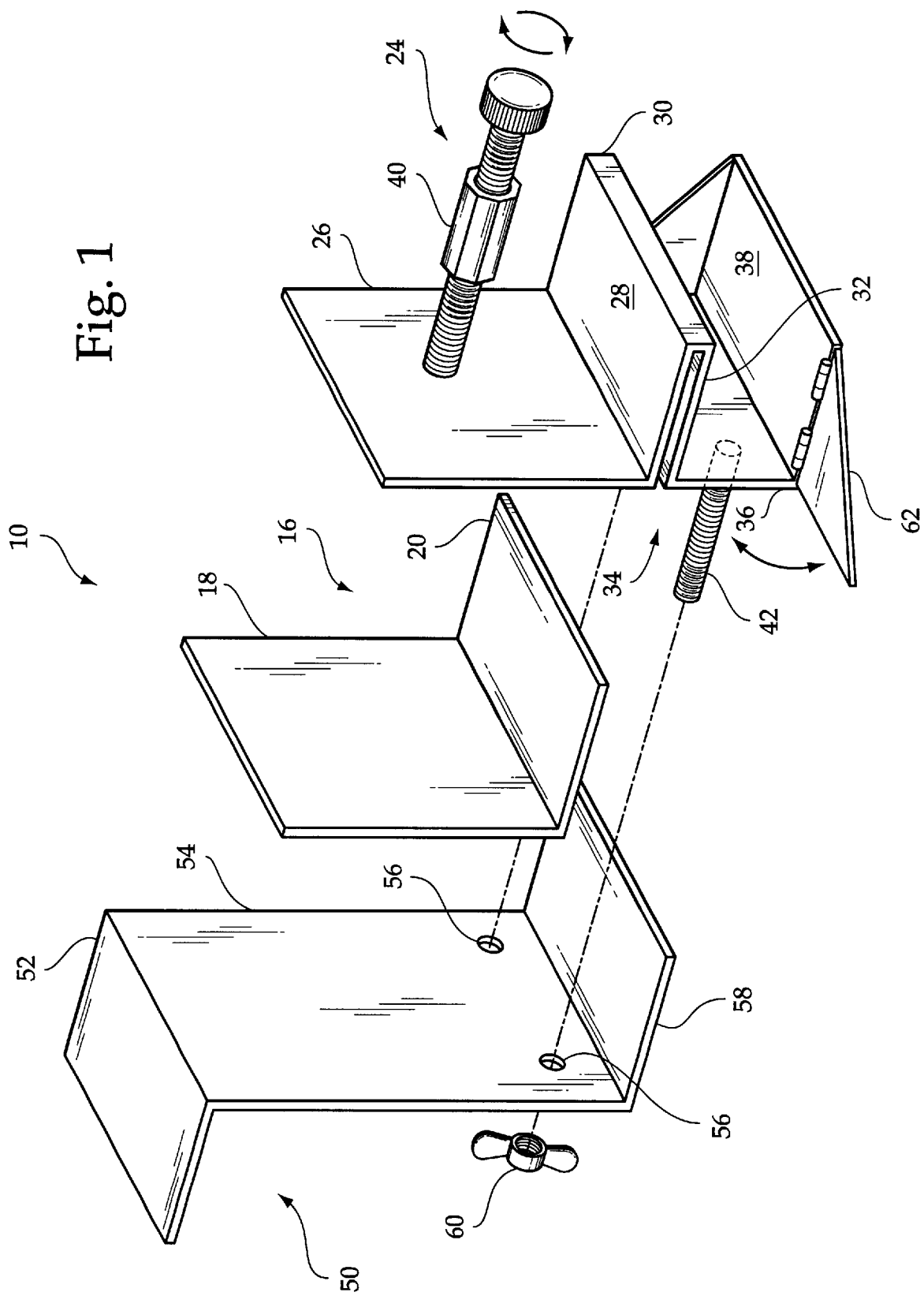
FIG. 1 is a perspective view of the preferred embodiment of the detachable ramp carrying system for moving containers constructed in accordance with the principles of the present invention.
Figure 2:
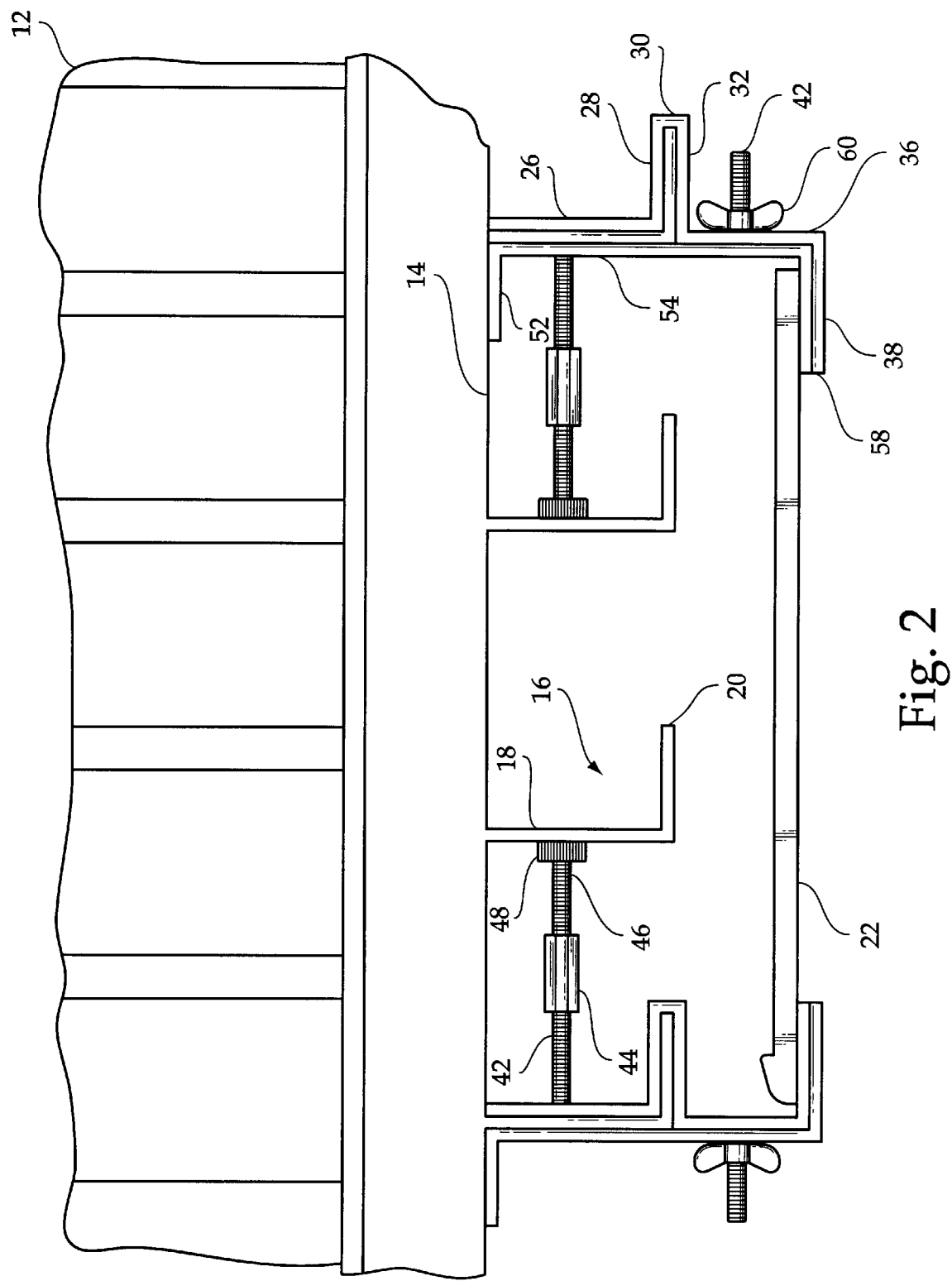
FIG. 2 is a side view of the present invention illustrated in use.

With reference now to the drawings, and in particular, to FIGS. 1 and 2 thereof, the preferred embodiment of the new and improved detachable ramp carrying system for moving containers embodying the principles and concepts of the present invention and generally designated by the reference number 10 will be described.

Specifically, it will be noted in the various figures that the device relates to a detachable ramp carrying system for moving containers for allowing a ramp to be transported for use with unloading a moving container. In its broadest context, the device consists of a pair of securement brackets. Such components are individually configured and correlated with respect to each other so as to attain the desired objective.

The present invention is designed for use with standard moving containers 12 that are typically used for shipping internationally. The moving container 12 includes a closed lower end 14. The closed lower end has a plurality of L-shaped brackets 16 extending downwardly therefrom in a spaced relationship. The brackets 16 each have a vertical upper segment 18 and a horizontal lower segment 20.

The pair of securement brackets 10 are coupled with the horizontal lower segments 20 of opposed L-shaped brackets 16 of the moving container 12. The securement brackets 10 support the ramp 22 thereon disposed below the closed lower end 14 of the container.

Each of the securement brackets 10 include an inner component 24 positioned between two of the L-shaped brackets 16 of the moving container 12. The inner component 24 includes a top vertical segment 26. The top vertical segment 26 has an upper end and a lower end. The inner component 24 includes a top horizontal segment 28 extending outwardly from the lower end of the top vertical segment 26. The top horizontal segment 28 has a free end. A short intermediate vertical segment 30 extends downwardly from the free end of the top horizontal segment 28. The short intermediate vertical segment 30 has a free end. An intermediate horizontal segment 32 extends inwardly from the free end of the intermediate vertical segment 30 whereby a channel 34 is formed between the top horizontal segment 28 and the intermediate horizontal segment 32. The intermediate horizontal segment 32 has a free end. A lower vertical segment 36 extends downwardly from the free end of the intermediate horizontal segment 32 and is linearly aligned with the top vertical segment 26. The lower vertical segment 36 has a free end. A lower horizontal segment 38 extends outwardly from the free end of the lower vertical segment 36. The inner component 24 includes an upper adjustable securement bolt 40 extending outwardly from the top vertical segment 26. The inner component 24 includes a pair of lower threaded bolts 42 extending inwardly from the lower vertical segment 36. The inner component 24 is positioned with respect to one of the L-shaped brackets 16 whereby the lower horizontal component 20 is received within the channel 34 and the top vertical segment 26 abuts the upper vertical segment 18 with the upper adjustable securement bolt 40 extending against the upper vertical segment 26 of an adjacent L-shaped bracket 16. Note FIG. 2. The upper adjustable securement bolt 40 is comprised of a fixed inner portion 42 having a receiving collar 44 on it's free end. The receiving collar 44 has an adjustable bolt 46 extending outwardly therefrom. The adjustable bolt 46 has a head 48 disposed on a free end thereof. The head 48 will abut the upper vertical segment 26 of the adjacent L-shaped bracket 16 in a locked orientation. Note FIG. 2.

Each of the support brackets 10 includes an outer component 50 that is positioned against one of the L-shaped brackets 16 opposed from the inner component 24. The outer component 50 includes a raised horizontal plate 52 having an inner end and an outer end. The outer component 50 includes an intermediate vertical plate 54 extending downwardly from the inner end of the raised horizontal plate 52. The intermediate plate 54 has a free lower end. The intermediate vertical plate 54 has a pair of apertures 56 therethrough. The outer component 50 includes a lower horizontal plate 58 extending inwardly from the free lower end of the intermediate vertical plate 54. The outer component 50 is positioned with respect to one of the L-shaped brackets 16 whereby the intermediate vertical plate 54 abuts the upper vertical segment 18 of the L-shaped bracket 16 with the apertures 56 receiving the lower threaded bolts 42 of the inner component 24 therein for securement by wing nuts 60 and the lower horizontal plate 58 is positioned below the lower horizontal segment 38 of the inner component 24. Thus, the support brackets 10 will be spaced sufficiently enough to allow the ramp 22 to be positioned on the combined lower horizontal segment 38 and the lower horizontal plate 58 and can easily slide outwardly from this position. Once the ramp 22 has been removed, the support brackets 10 can be removed for use on the next moving container. Additionally, the lower horizontal segment 38 could be provided with fold down doors 62 that could be used to prevent the movement of the ramp 22 when in a locked orientation.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and the manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A detachable ramp carrying system for moving containers for allowing a ramp to be transported for use with unloading a moving container, wherein the moving container includes a closed lower end, the closed lower end having a plurality of L-shaped brackets extending downwardly therefrom in a spaced relationship, the brackets each having a vertical upper segment and a horizontal lower segment, the system comprising, in combination:

a pair of securement brackets coupled with the horizontal lower segments of opposed L-shaped brackets of the moving container, the securement brackets supporting the ramp thereon disposed below the closed lower end of the container, wherein each of the securement brackets including:

an inner component positioned between two of the L-shaped brackets of the moving container, the inner component including a top vertical segment, the top vertical segment having an upper end and a lower end, the inner component including a top horizontal segment extending outwardly from the lower end of the top vertical segment, the top horizontal segment having a free end, a short intermediate vertical segment extending downwardly from the free end of the top horizontal segment, the short intermediate vertical segment having a free end, an intermediate horizontal segment extending inwardly from the free end of the intermediate vertical segment whereby a channel is formed between the top horizontal segment and the intermediate horizontal segment, the intermediate horizontal segment having a free end, a lower vertical segment extending downwardly from the free end of the intermediate horizontal segment and being linearly aligned with the top vertical segment, the lower vertical segment having a free end, a lower horizontal segment extending outwardly from the free end of the lower vertical segment, the inner component including an upper adjustable securement bolt extending outwardly from the top vertical segment, the inner component including a pair of lower threaded bolts extending inwardly from the lower vertical segment, the inner component being positioned with respect to one of the L-shaped brackets whereby the lower horizontal component is received within the channel and the top vertical segment abutting the upper vertical segment with the upper adjustable securement bolt extending against the upper vertical segment of an adjacent L-shaped bracket; and an outer component positioned against one of the L-shaped brackets opposed from the inner component, the outer component including a raised horizontal plate having an inner end and an outer end, the outer component including an intermediate vertical plate extending downwardly from the inner end of the raised horizontal plate, the intermediate plate having a free lower end, the intermediate vertical plate having a pair of apertures therethrough, the outer component including a lower horizontal plate extending inwardly from the free lower end of the intermediate vertical plate, the outer component being positioned with respect to one of the L-shaped brackets whereby the intermediate vertical plate abuts the upper vertical segment of the L-shaped bracket with the apertures receiving the lower threaded bolts of the inner component therein for securement by wing nuts and the lower horizontal plate positioned below the lower horizontal segment of the inner component.

2. A detachable ramp carrying system for moving containers for allowing a ramp to be transported for use with unloading a moving container, wherein the moving container includes a closed lower end, the closed lower end having a plurality of L-shaped brackets extending downwardly therefrom in a spaced relationship, the brackets each having a vertical upper segment and a horizontal lower segment, the system comprising, in combination:

a pair of securement brackets coupled with the horizontal lower segments of opposed L-shaped brackets of the moving container, the securement brackets supporting the ramp thereon disposed below the closed lower end of the container.

3. The detachable ramp carrying system as set forth in claim 2, wherein each of the securement brackets including an inner component positioned between two of the L-shaped brackets of the moving container and an outer component positioned against one of the L-shaped brackets opposed from the inner component.

4. The detachable ramp carrying system as set forth in claim 3, wherein the inner component includes a channel whereby the lower horizontal component is received within the channel.

5. The detachable ramp carrying system as set forth in claim 3, wherein the inner component including an upper adjustable securement bolt extending outwardly therefrom extending against the upper vertical segment of an adjacent L-shaped bracket.

* * * * *